United States Patent
Wolff et al.

(10) Patent No.: US 12,161,259 B1
(45) Date of Patent: Dec. 10, 2024

(54) APPARATUS FOR THAWING FROZEN FOOD AND FOR CHILLING HOT FOOD

(71) Applicant: CNSRV, Inc., Los Angeles, CA (US)

(72) Inventors: Dylan Wolff, Los Angeles, CA (US); Alex Spataru, Los Angeles, CA (US); Brett Abrams, Santa Monica, CA (US); William Hamelin, Los Angeles, CA (US); Ernie Reed, Chino, CA (US); Ricardo Martinez, Lancaster, CA (US); Michael Maffe, Los Angeles, CA (US); Frank Yannick Huisman, Granada Hills, CA (US)

(73) Assignee: CNSRV, Inc., Los Angeles, CA (US)

( * ) Notice: Subject to any disclaimer, the term of this patent is extended or adjusted under 35 U.S.C. 154(b) by 252 days.

(21) Appl. No.: 17/551,154

(22) Filed: Dec. 14, 2021

Related U.S. Application Data

(63) Continuation-in-part of application No. 16/684,321, filed on Nov. 14, 2019, now abandoned.

(51) Int. Cl.
| | |
|---|---|
| A47J 36/24 | (2006.01) |
| A23B 4/07 | (2006.01) |
| A23L 3/12 | (2006.01) |
| A23L 3/365 | (2006.01) |
| F25D 1/00 | (2006.01) |
| F25D 17/02 | (2006.01) |

(52) U.S. Cl.
CPC ............. *A47J 36/2405* (2013.01); *A23B 4/07* (2013.01); *A23L 3/12* (2013.01); *A23L 3/365* (2013.01); *F25D 1/00* (2013.01); *F25D 17/02* (2013.01)

(58) Field of Classification Search
None
See application file for complete search history.

(56) References Cited

U.S. PATENT DOCUMENTS

| | | | | |
|---|---|---|---|---|
| 1,873,820 | A * | 8/1932 | Carpenter | F24H 1/121 |
| | | | | 392/493 |
| 3,636,308 | A * | 1/1972 | Hatch | A23L 3/365 |
| | | | | 219/439 |
| 4,754,698 | A * | 7/1988 | Naish | C12C 13/10 |
| | | | | 99/275 |
| 5,665,412 | A * | 9/1997 | Fuller | A23L 3/365 |
| | | | | 426/524 |
| 2002/0015585 | A1 * | 2/2002 | Jensen | H05B 3/82 |
| | | | | 392/501 |
| 2008/0305222 | A1 * | 12/2008 | Takenaka | A23L 3/365 |
| | | | | 62/380 |
| 2012/0251695 | A1 * | 10/2012 | Neff | A47J 27/10 |
| | | | | 99/330 |
| 2015/0135974 | A1 * | 5/2015 | Ambrosi | A47J 36/24 |
| | | | | 99/483 |
| 2017/0280737 | A1 * | 10/2017 | Liao | C02F 1/325 |
| 2021/0177197 | A1 * | 6/2021 | Streeck | A47J 36/2405 |

* cited by examiner

*Primary Examiner* — John J Norton
(74) *Attorney, Agent, or Firm* — Van Pelt, Yi & James LLP

(57) ABSTRACT

A method for defrosting frozen foods by recycling the water that is used to defrost the frozen foods. Food is first placed inside of a container and then water is pumped from the bottom of the container where the water is heated and by use of a pump and natural rise of heat allowed to flow around the food.

11 Claims, 16 Drawing Sheets

APPARATUS FOR THAWING FROZEN FOOD AND FOR CHILLING HOT FOOD

CROSS-REFERENCE TO RELATED APPLICATION

This patent application is a continuation-in-part of patent application Ser. No. 16/684,321 filed on Nov. 14, 2019, now pending; which was a continuation-in-part of patent application Ser. No. 16/029,623 now issued as U.S. Pat. No. 10,952,447 on Mar. 23, 2021.

BACKGROUND OF THE INVENTION

1. Field of the Invention

The present invention relates to the field of thawing frozen food, primarily meat, for preparing unthawed food to be served in commercial establishments such as restaurants.

In addition, the present invention relates to the field of chilling hot food to a legally required lower temperature within a legally required period of time before placing the food into a freezer for subsequent use.

2.1 General Background

It is common in the food industry to store food, especially meat, in a frozen condition until it is ready to be cooked. In general, the thawing process used in most restaurants is to place the frozen food, usually individually vacuum sealed, in a sink and permit water to flow over the frozen food until the frozen food is thawed. Water runs down the drain hole in the sink after the water has passed over the frozen food in the sink. The thawing process takes several hours. The process results in an enormous waste of water.

In addition, restaurants prepare a quantity of hot food, especially soup and sauces, which are not always fully consumed during the meal for which the hot food was prepared. It is a legal requirement for the food to be reduced to a lower temperature within a legally required period of time before the food is placed into a freezer for subsequent use.

2.2 Description of the Prior Art

The following 6 patents and published patent applications are the closest prior art known to the inventors.
1. U.S. Pat. No. 4,062,277 issued to Gilbert L. Powers on Dec. 13, 1977 for "Defrosting Apparatus".
2. U.S. Pat. No. 5,665,412 issued to Robert Fuller et al. on Sep. 9, 1997 for "Method for Thawing Frozen Food".
3. U.S. Pat. No. 6,691,608 issued to Brett D. Thompson on Feb. 17, 2004 for "Frozen Food Thawing Device".
4. United States Published Patent Application No. 2013/0062038 to Christopher E. Pearson on Mar. 14, 2013 for "Method and Device for Thawing Frozen Substances".
5. United States Published Patent Application No. 2015/0007588 to John Cantrell et al. on Jan. 8, 2015 for "Defrost Apparatus and Method Thereof".
6. United States Published Patent Application No. 2015/0135974 to Rudy Ambrosi et. al. on May 21, 2015 for "Recirculating Water Defroster".

The present inventors are not aware of any prior art patent or publication which discloses or makes obvious the innovation disclosed and claimed in this continuation in-part patent application.

SUMMARY OF THE INVENTION

The present invention is an apparatus for thawing frozen foods by recycling the water that is used to thaw the frozen foods. Food is first placed inside of a container. Water is then pumped from the bottom of the container where the water is heated and, by use of a pump and natural rise of heat, allowed to flow around the food. When the water reaches the top of the container, it spills over the top and is pumped back into the bottom of the container as a continuous process until the food is thawed.

In one embodiment of the present invention, a sink drain hole is plugged and the present invention apparatus is placed into the sink. After the allotted thawing time has been accomplished as discussed below, the drain plug is removed, water flows down the drain, and fresh water is poured into the sink and container. In a second embodiment, the present invention container is inside a second outer container. After the allotted thawing time has been accomplished as discussed below, the water is drained from both buckets and fresh water is poured into the two buckets.

It is an object of the present invention to have an apparatus for thawing food where during the thawing process the water flows from a lower elevation to a higher elevation within a container during the thawing process.

It is also an object of the present invention to have a pump that performs the function of recycling the water.

It is an additional object of the present invention to have a large container that is placed in a sink with a stopper in the sink drain hole and the container filled with room temperature water. The container is then allowed to overflow with water.

It is a further object of the present invention to provide an apparatus for restaurants that receive frozen and vacuum-sealed food to thaw the food. First, all the food is placed in the container. Then the container is filled with water and thereafter filled to a level where the water elevation within the container is higher than the elevation of the pump.

It is still a further object of the present invention to provide a container with a water pump affixed to the outside of the container that pumps water from outside of the container to the inside at a location adjacent the bottom of the container. This water is then heated and allowed to flow upward through the container to thaw the food within the container. The container may have holes near the top of the container for water to flow out of the container through the holes. If the container has no holes, then the water within will exit the container as it overflows over the top edge of the container.

It is a further object of the present invention to provide a submersible heating element that is affixed to the side of the container that heats the water as it enters the container from the bottom. The heater has a thermostat to set the water temperature at a predetermined temperature. A preferred temperature is 68 degrees Fahrenheit. In no event should the water temperature ever exceed 70 degrees Fahrenheit. When the water reaches the set temperature, the heater shuts off until the water gets cold again and then it reheats.

It is a further object of the present invention to provide an alarm to alert that two hours have passed. This device could also be installed with an automatic shutoff after two hours. Many existing retail codes require that frozen food may be thawed by completely submerging under potable running water for a period not to exceed two hours at a water temperature of 70 Fahrenheit or below, and with sufficient water velocity to agitate and flush off loose particles into the sink drain. Therefore, the present invention will assist restaurants and noncommercial users in complying with this food safety requirement. After two hours the water should be changed to prevent the growth of bacteria.

At the end of the thawing process, the food goes from a thawed state to an unthawed state. Typically, the defrosting is done all at once and therefore the food is ready for cooking or if not ready to be cooked immediately, is placed into a refrigerator be kept cold.

It is still a further object of the present invention to provide a process that helps to thaw all portions of the food, not just the top and bottom portions. Since the heat transfer is taking place from the submersible heater, this aids in thawing all portions of the food. This is a key innovation of the present invention. Further, the benefit of having the heat come from the bottom is that it captures the warmer water from the top and heat rises so it goes up as opposed to previous prior art devices which simply shower the food and therefore do not allow the warm water to reach the bottom of the container.

It is still a further object of the present invention to provide a container that has a typical length of 12 inches and width of 12 inches and a height that is between 12 inches and 24 inches. However, it is within the spirit and scope of the present invention to be of a multitude of sizes and shapes with the caveat that the present invention should be designed to fit within a standard sized restaurant sink.

It is still a further object of the present invention to provide handles on the container so that the container can be easily removed and/or lifted out of the sink.

In an alternative embodiment, instead of using a sink, the container which is essentially the same as the container identified above is set within a second container so that it is dual container assembly. Therefore, instead of having to place the container inside a sink, the container is placed inside an exterior container and then after the two hours are concluded, the water from the interior container is drained into the exterior container and entirely discarded.

The device works essentially the same way as the first embodiment but instead of having the requirement of placing the container inside a sink, that is eliminated and instead, the container is placed inside an exterior container to avoid the necessity of having to lift the container in and out of a sink.

In addition to the requirements to thaw food, a separate issue addressed in this continuation-in-part application is re-serving hot food which is not fully used during the day in which it was prepared. Typically, a large quantity of hot food such as soup and sauces for pastas are prepared. The soup and pastas sauces are prepared at a temperature of one hundred sixty-five degrees Fahrenheit. When served, the soup or pasta sauce is at one hundred forty degrees Fahrenheit. At the dining table, heat convection enables the soup or pasta sauce to cool to an edible temperature.

Depending on the number of customers and what they order, a quantity of hot soup or sauce is left over. It is a food and drug administration legal requirement that any leftover soup, sauce or comparable hot food item which is at a serving temperature of one hundred forty degrees Fahrenheit must be cooled to a temperature of seventy degrees Fahrenheit within two hours. Once the food is cooled to seventy-degrees Fahrenheit, it can be stored overnight in a freezer where it cools to forty degrees Fahrenheit. It can then be reheated on a subsequent day for heating to one-hundred sixty-five-degrees Fahrenheit.

It is therefore an object of the present invention to place leftover hot food which is at one hundred forty-degrees Fahrenheit into one or more containers and to cool the hot food down to seventy degrees Fahrenheit within two hours.

In order to follow a key principle of the present invention which is to conserve water during the food thawing or freezing process, the present inventor Dylan Wolff has created a modification to his previous thawing invention.

Specifically, the dual container concept is used. An interior container is placed inside an exterior container. The interior container is filled with ice to a level from one-quarter of the interior container volume to eighty-percent of the interior container volume. The remainder of the interior container is filled with water. A submersible water pump is located outside of the interior container and preferably affixed in a leakproof manner adjacent the bottom of the interior container. The submersible pump is located between the interior container and the exterior container. The interior container is filled with sufficient water to enable the water to overflow out of the interior container and flow into the exterior container to a level above the submersible pump so that the submersible pump is entirely within water. When the pump is turned in, it causes water mixed with ice to flow to the top of the interior container where the water flows into the interior container and is continuously recirculated through the ice-filled interior container where the flow of ice water over the containers of hot food within the ice and cold water of the interior container reduces the temperature of the food from one hundred-forty-degrees Fahrenheit to seventy degrees Fahrenheit within two hours.

To achieve this result, the ice and water recirculation flow rates must be at least 2.5 gallons per minute and above. Preferably, a thermometer is affixed to each separate hot food container. With at least the interior container being transparent and preferably both containers being transparent, an observer can see when the food temperature has dropped to seventy-degrees Fahrenheit. Optionally, a timer is affixed at a location adjacent a top of either container so an observer can determine if the hot food is being reduced to seventy degrees Fahrenheit within the two hour window. If the chilling process is moving to slow, the recirculation flow rate of the pump is increased to speed up the heat reduction process.

When the hot food has had its temperature reduced to seventy degrees Fahrenheit, it is removed from the interior container and placed in a freezer which is set to reduce the temperature to forty degrees Fahrenheit.

In one embodiment, the interior container is filled with ice and water as just described and the submersible pump is the only operating mechanism for recirculating the ice filled water.

In an alternative embodiment, both the pump and a heater as previously described are retained within the dual container assembly and an operating switch is located exterior to the exterior container. When the operating switch is moved in one direction, only the submersible pump is operational to chill the hot food as just described. When moved in the opposite direction, both the heater and the pump are operational and function to thaw frozen food as described in the parent application.

For reducing the temperature of hot food, the dual container embodiment provides the previously discussed advantages. Therefore, instead of having to place the container inside a sink, the container is placed inside an exterior container and then after the two hours are concluded, the water and ice from the interior container are drained into the exterior container and entirely discarded.

In an alternative embodiment, it is an object of the present invention to provide a container having a plumbing system affixed under a tank that efficiently moves water through the inlet within the tank using a pump that moves fluid through the system.

It is a further object of this present invention to provide a container with a filtration system that has pump circulation in a generally horizontal plane.

It is a further object of this present invention to provide a container having a pump system that contains a mesh screen for filtration and Ultraviolet Light system directly connected to the pump to sanitize the water and kill viruses and bacteria.

It is still a further object of this present invention to provide a container having a switch at the base that can switch between defrost (operating both pump+ thermostatic controlled heating element) setting and chill (operating only the pump) setting.

It is a further object of this present invention to provide a container having a plumbing system affixed under a tank that efficiently moves water through the inlet within the tank using a pump that moves fluid through the system where the fluid sanitized with uv-c light, heated (if needed) and sent back up out through the outlet within the tank at a specific angle that works in concert with the inlet to create a specified circular agitation with eddy currents that maximizes heat transfer and energy usage with a minimum amount of energy usage. The angle and placement of the inlet and outlet is critical to creating the specified needed flow.

It is still a further object of this present invention to provide a container having a pump system where water flow can be modified to the specific need of defrosting or chilling specific types of food by controlling the power of the pump by adjusting the number of coils activated within the pump and not by using a resistor or blocking the flow of water due to the need of some foods needing more flow and some needing less. Additionally, this is an improvement over prior systems because friable foods which have a tendency to fall apart are protected by this current design as opposed to vertical pulling and pushing forces of fluid.

It is still a further object of this present invention to provide a container having a water sensor connected to the pump that will automatically shut off the system if no water is present.

It is still a further object of this present invention to provide a container having a system that provides greater heat transfer surface area for the same amount of water by creating space within the system for the transfer to occur more efficiently.

It is a further object of this present invention to provide maximum agitation on the surface of the food to be defrosted given a specific rate of liquid/water flow and a specific level of liquid/water inside the container when the food to be defrosted is present within—a set of solutions for several variables were researched. The variables in question include—and are not limited to: (a) location of the holes in the bottom container through which the liquid/water pipes are positioned; (b) the height of the liquid/water intake and outflow ports from the bottom of the container; (c) the diameter of the liquid/water intake and outflow pipes; (c) the angle from horizontal of the intake and outflow pipe ports; (d) the angle from the vertical of the intake and outflow pipe ports; and (e) the angle from vertical of the container walls.

Additionally, it is within the spirit and scope of this invention for the pump system to not be limited by the specific size of the pipe, number of pipe fittings within system or specific threading of connections. However, the following table represents a typical design for a plumbing system in fifth embodiment of this container assembly:

| PART TYPE | THREAD TYPE | DESCRIPTION | QTY. |
|---|---|---|---|
| RMI 6 Bushel Tub | | | |
| 2"-.5" Reducing Coupling | FNPT x FNPT | For pump | |
| 2" 90 deg Elbow | MNPT x MNPT | | 4 |
| 2" Tee | FNPT x FNPT x FNPT | | |
| 2"-.25" Reducing Bushing | MNPT x FNPT | For heater | 2 |
| 2" Nipple (2.5" length) | MNPT x MNPT | | 2 |
| 2"-" Reducing Tee | FNPT x FNPT x FNPT | For drain | |
| "-0.5" Reducing | MNPT x FNPT | | |
| 0.5" Tee | FNPT x FNPT x FNPT | | |
| 0.5" Nipple (" length) | MNPT x MNPT (closed thread) | | 2 |
| 0.5" PVC Adapter | MNPT x Barbed Insert | | |
| 0.5" Valve | MNPT x Socket | | |
| 2" Nipple (2" length) | MNPT x MNPT (closed thread) | | 2 |
| BPL-2000 Pump | | | |
| 0.5" Flexi Hose (7" length) | | | |
| Heater | | | |
| 2" Flanged Back Nut | NPT | To seal tub floor | 3 |
| 2" Nipple (6" length) | MNPT x MNPT | | |
| 2" Pipe Hanger | | Structural | 3 |
| Custom Pipe Hanger Offset | | | 2 |
| Custom Wheel Spacers | | | 4 |

It is still a further object of the present invention to vary the pump flow according to the friability, or tendency to pull apart, of the food and as its heat transfer characteristics change as the food thaws out. This is due to some foods freezing and thawing better than others. Thus, adjusting the flow by varying the number of pump motor coils that are excited as to match the amount of energy needed to the amount of energy optimizes the energy used. Additionally, the flow of the water/fluid can be adjusted to the level of agitation prescribed by the fragility and friability of the items being defrosted. Another differentiation is that the innovation's water flow can be both continuous as well as variable or pulsating, depending which is best suited for the items being defrosted.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
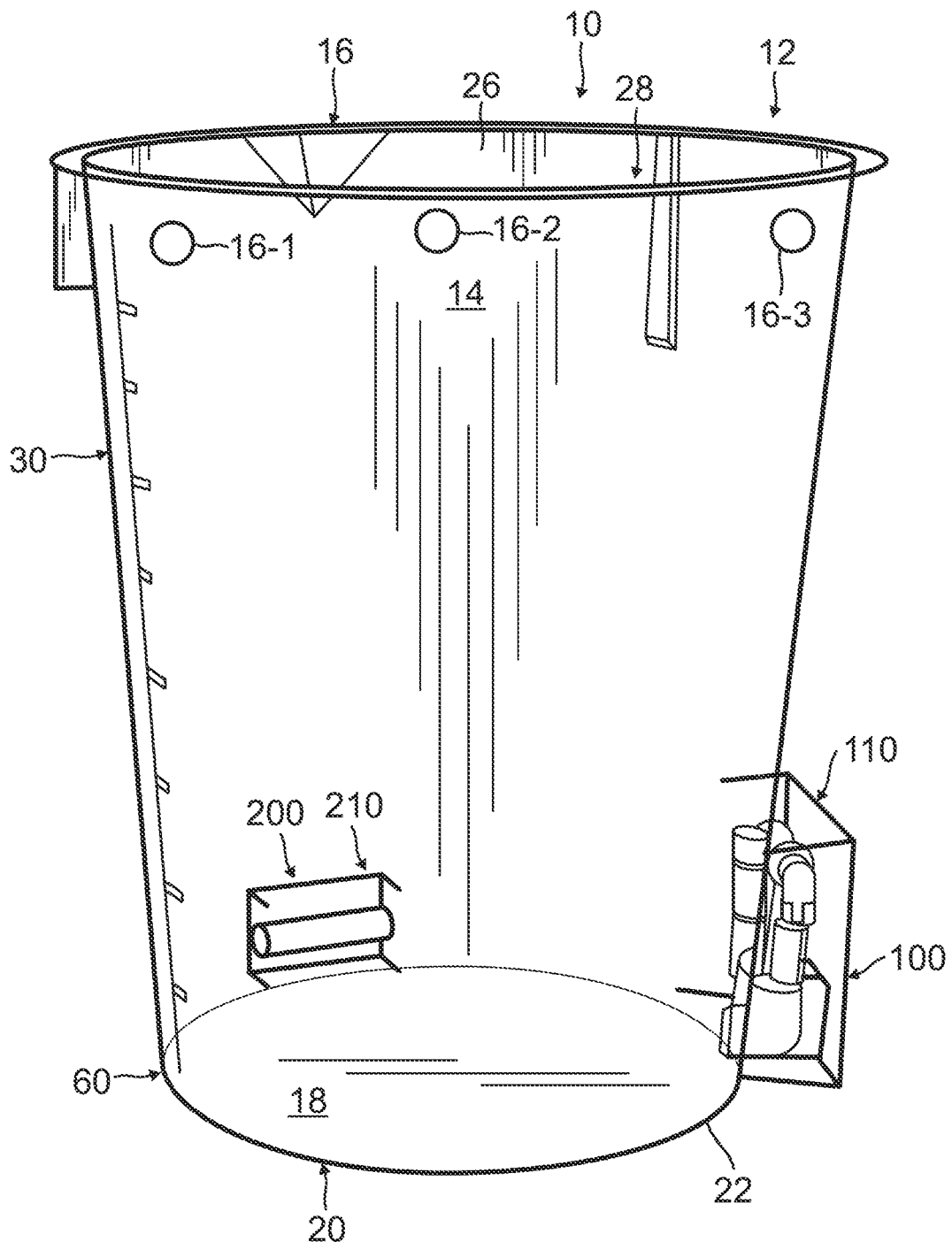
FIG. 1 is a front elevational view of a first embodiment of the present invention illustrating a food thawing container having a submersible water pump within a casing affixed to the outside of the container and a heating element within a separate casing affixed to the outside of the container.

Referring to FIG. 1, there is illustrated a front elevational view of a first embodiment of the present invention food thawing container 10 having a submersible water pump 100 within a casing 110 enclosing water pump 100. The casing or enclosure 110 is affixed to the exterior circumferential wall 14 and a heating element 200 within a heating element casing or enclosure encasing 210 affixed to the exterior circumferential wall 14 of the food thawing container 10. Further illustrated in FIG. 1, food thawing container 10 has a top circumferential edge 12, a top overflow spout 16, a bottom interior surface 18, a bottom exterior surface 20, an upper portion 30, a lower portion 60, a bottom circumferential edge 22, an interior circumferential wall 26, an exterior circumferential wall 14, and an interior chamber 28. Instead of an overflow spout 16, the container can have a multiplicity of draining members such as 16-1, 16-2 and 16-3 which are drain openings located adjacent the top of the container 14.

Figure 2:
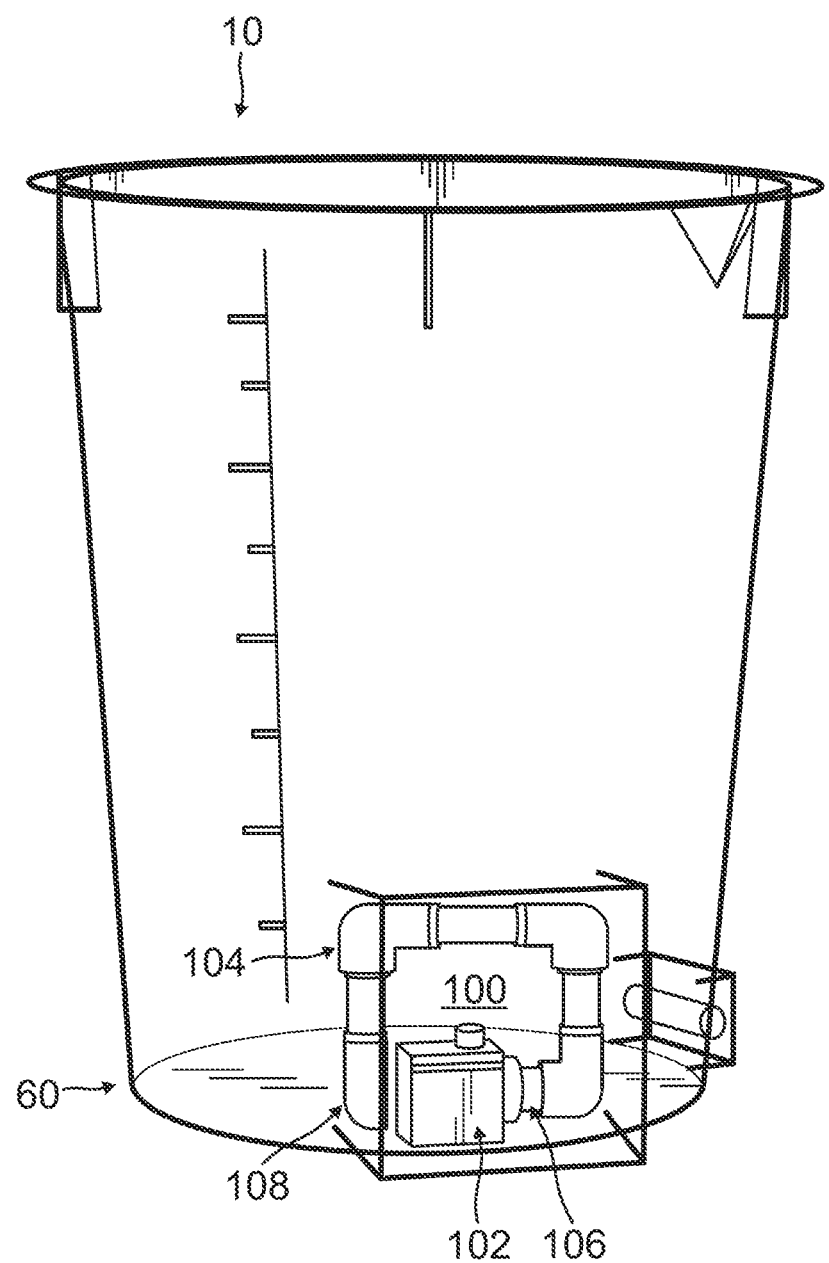
FIG. 2 is a right side elevational view of the first embodiment of the present invention illustrating a food thawing container having a submersible water pump within a casing affixed to the outside of the container and a heating element within a casing affixed to the outside of the container.

Referring to FIG. 2, there is illustrated a right front elevational view of the present invention food thawing container 10 having a submersible water pump 100 on the lower portion 60 of exterior circumferential wall 14 within casing 110. Submersible water pump 100 has an intake valve 102 that connects to a discharge line 104 which is made of material selected from the group consisting of polyvinyl chloride (PVC) pipe, rubber hose, isoprene, metal or derivatives thereof. Discharge line 104 includes a line intake section 106 and a line exit section 108. Line exit section 108 is directed towards bottom interior surface 18 of food thawing container 10.

Figure 3:
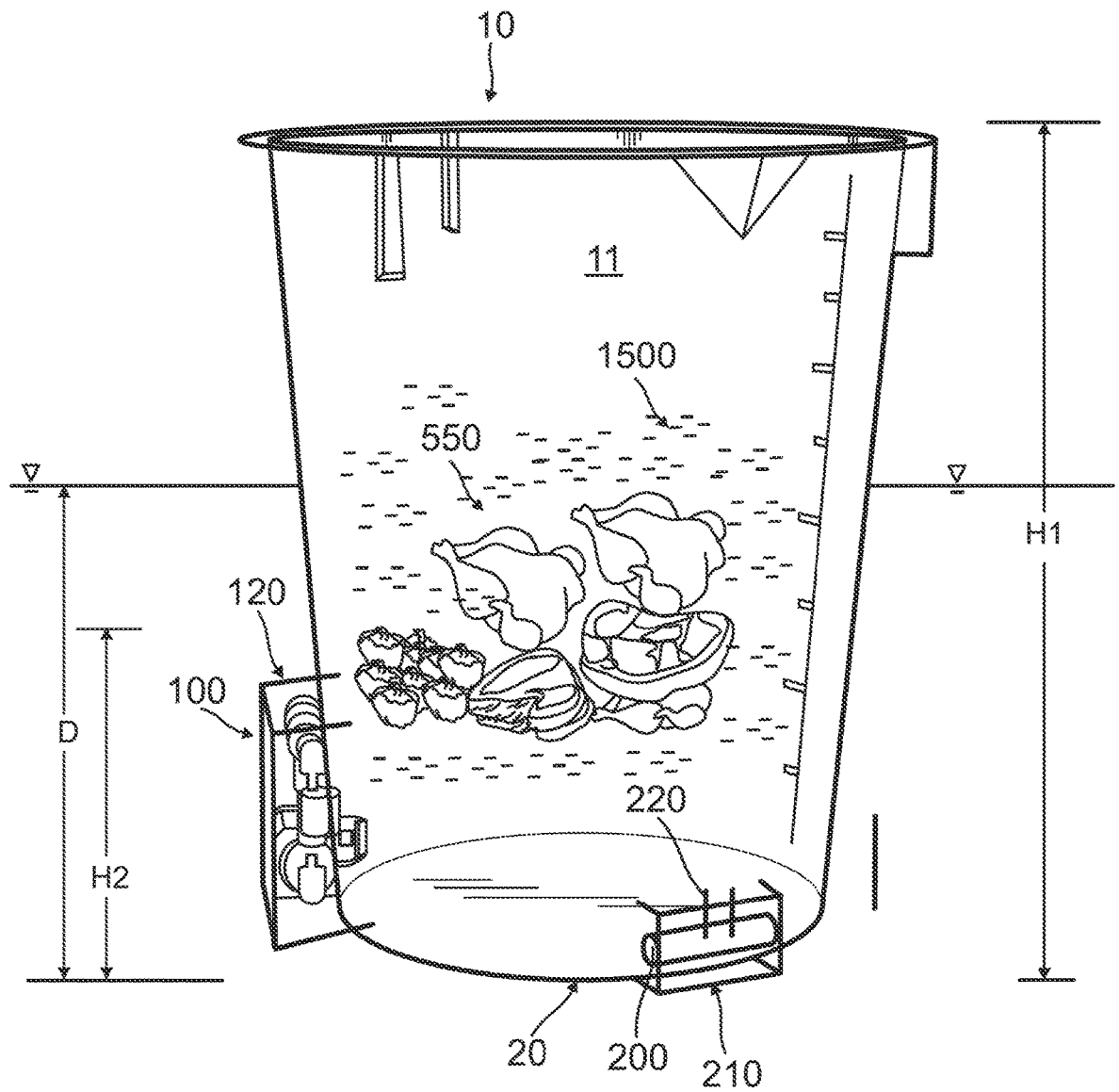
FIG. 3 is a left side elevational view of the first embodiment of the present invention illustrating a food thawing container having a submersible water pump within a casing affixed to the outside of the container and a heating element within a casing affixed to the outside of the container.

Referring to FIG. 3, there is illustrated a left front elevational view of the present invention food thawing container 10 having a heating element 200 on the lower portion 60 of exterior circumferential wall 14. Heating element 200 is encased within heating element encasing 210. Heating element 200 can be controlled by a temperature thermostat to heat water outsider the container 10 to be heated to a desired temperature of water to be used to thaw the food contained in food thawing container 10. Many existing government retail codes require that frozen food may be thawed by completely submerging it under potable running water for a period not to exceed two hours at a water temperature of 70 degrees Fahrenheit or below, and with sufficient water velocity to agitate and flush off loose particles into the sink drain. Therefore, it is not only desirable to have a water temperature that is 70 degrees Fahrenheit or below, but a requirement in the retail industry in California. The present invention temperature thermostat allows a multitude of temperatures that enables the user to comply with a desired or required temperature.

Further referring to FIG. 3, frozen food which may be vacuum sealed 660 is placed into the interior chamber 1 of container 10. In addition, thereafter, water 1500 is pumped from outside container 10 through exterior wall 14 into interior chamber 11 through discharge line 108 from pump 100. The horizontal flow of water 1500 creates a centrifugal force. The water will continue to flow upwardly within interior container 11 by means of heat tending to move from an area of higher temperature to an area of lower temperature. When the water rises to an elevation near inner top circumferential edge 12 of container 10, the water will flow from back into a sink (see FIG. 5) by means of inner top overflow spout 16. This creates a circular flow of water using the same volume of water within present invention food thawing container 10. This volume of water will continue to thaw frozen food 550 by heated water flowing from inner lower portion 60 to the inner top circumferential edge 12.

Figure 4:
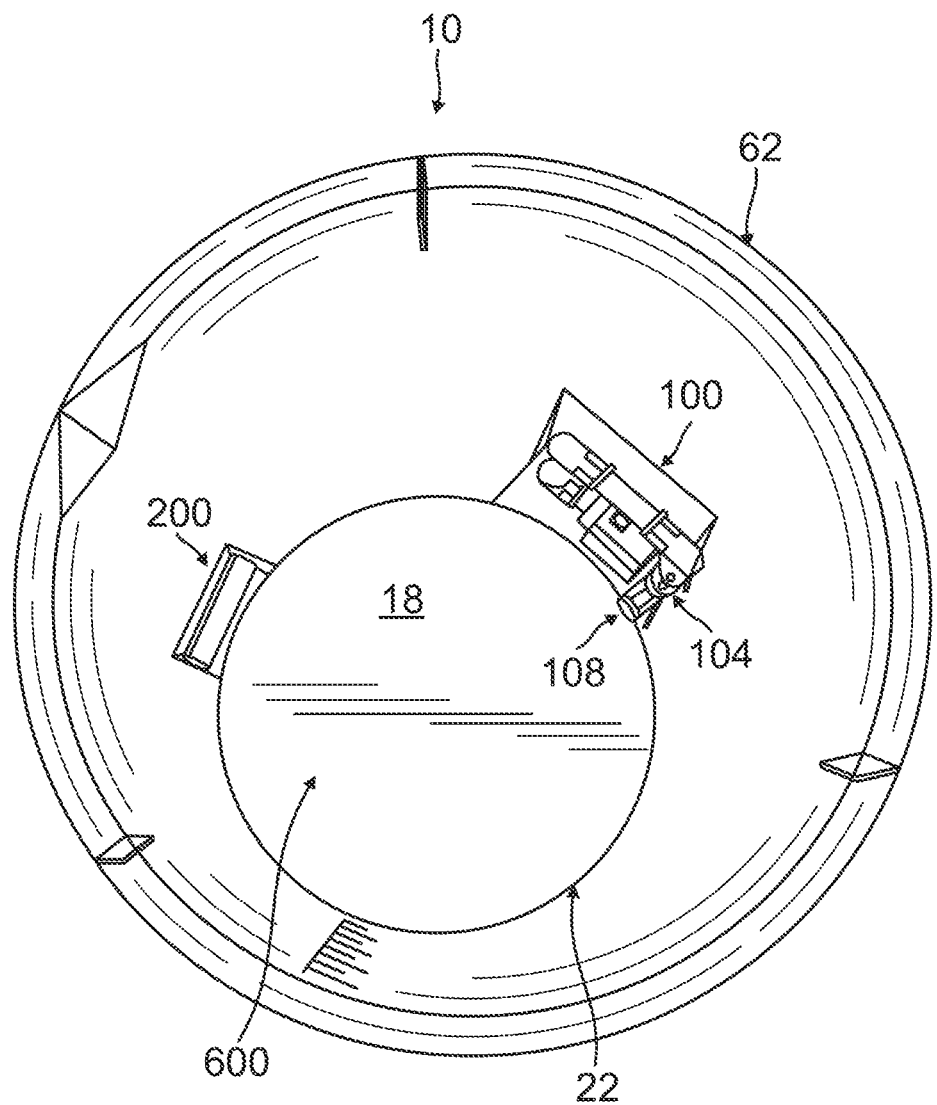
FIG. 4 is a top view of the first embodiment of the present invention illustrating a food thawing container having a submersible water pump within a casing affixed to the outside of the container and a heating element within a casing affixed to the outside of the container.

This process is continued until a desired time set by the user. This time can be controlled by existing government retail codes or by a time determined by a different set of criteria. Referring to FIG. 4, there is illustrated a top view of the present invention food thawing container 10 having submersible pump 100 and a heating element 200 shown to be outside of bottom circumferential edge 22. Also illustrated is top circumferential edge 12 and bottom interior surface 18.

Figure 5:
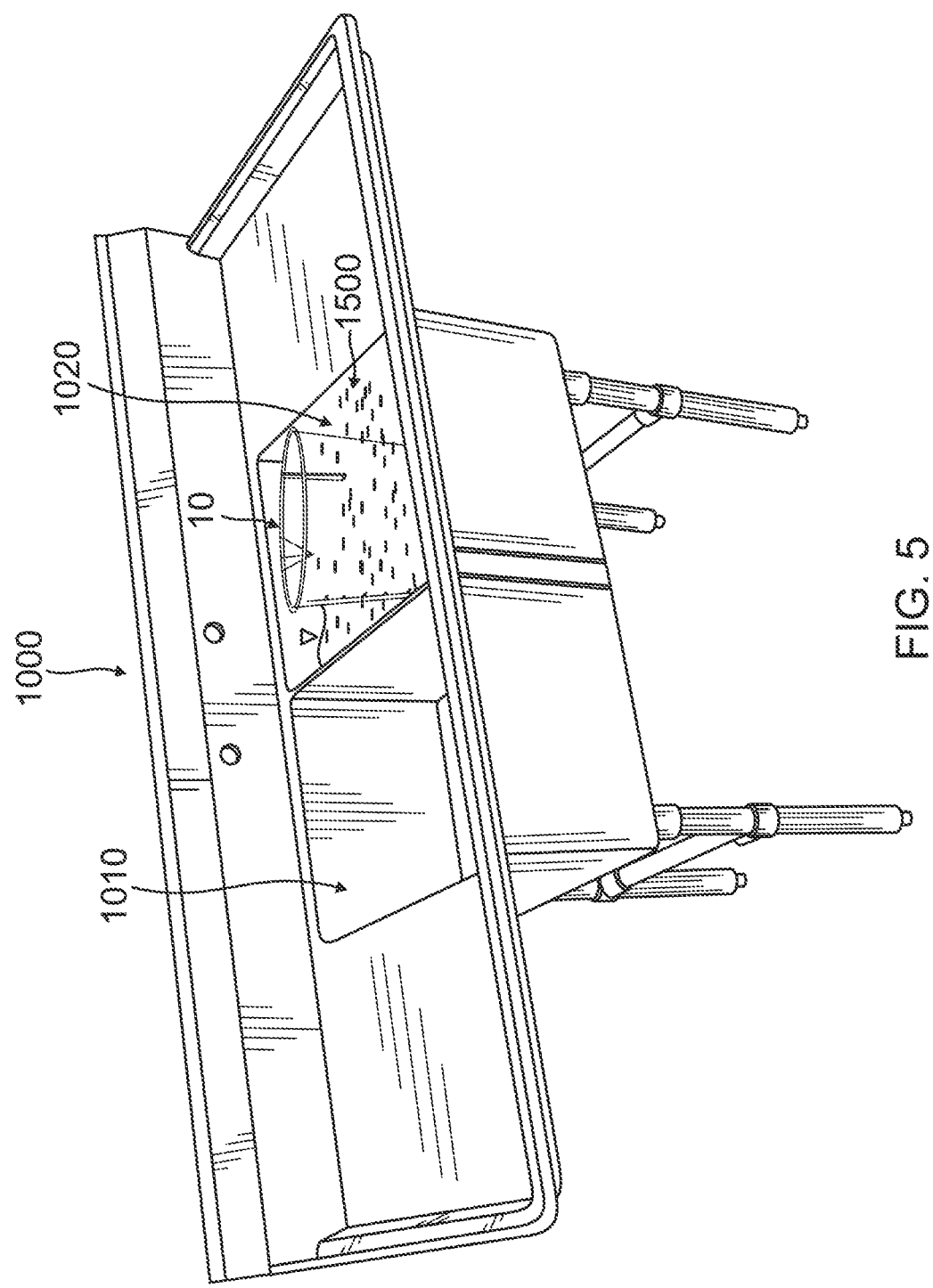
FIG. 5 is a top-front perspective view of a dual commercial sink with the first embodiment of the present invention food thawing container placed within one of the sinks.

Referring to FIGS. 3, 4, and 5, there is illustrated line exit section 108 of discharge line 104 that is the exit point of the water that moves from outside of food thawing container 10 and flows onto bottom interior surface 18 of food thawing container 10. As shown in FIG. 5, the present invention food thawing container 10 is designed to be placed into a sink or commercial sink 1000. A stopper (not shown) is used to plug a drain opening in the sink to prevent water from flowing out of the sink through a drain pipe. Right sink 1020 is then filled with water up to an elevation D (FIG. 3) that is greater than the height H2 of pump encasing top surface 120 of pump encasing 110 but not greater than the depth of the sink being used. The present invention thawing container 10 has a height H1 which preferably is not taller than the sink is deep.

In operation, submersible water pump 100 moves water 1500 that is outside of food thawing container 10 and within a right sink 1020 from outside of food thawing container 10 and into food thawing container 10. The water 1500 flows from outside of food thawing container 10 where it is heated by heating element 200 to a desired temperature set by thermostat 220 (see FIG. 3) and then pumped into food thawing container 10. While within food thawing container 10, water 1500 flows upwardly through the food thawing container 10 passing around food 550 (which may be vacuum sealed).

The present invention is designed to have a pump that produces a velocity of water that is sufficient to comply with current government retail codes. Further, the present invention is an improvement over the prior art since heat within matter naturally rises. This phenomenon common in the laws of thermodynamics states that heat tends to move from an area of higher temperature to an area of lower temperature. Therefore, within the present invention food thawing container 10 working in conjunction with a sink system, water will flow from the interior bottom surface 18 to top circumferential edge 12 and then flow out of food thawing container 10 by means of top overflow spout 16 and return to right sink 1020 and/or outside of food thawing container 10. This process is continued until a desired time set by the user. This time could be controlled by existing government retail codes or a time determined by a different set of criteria.

Figure 6:
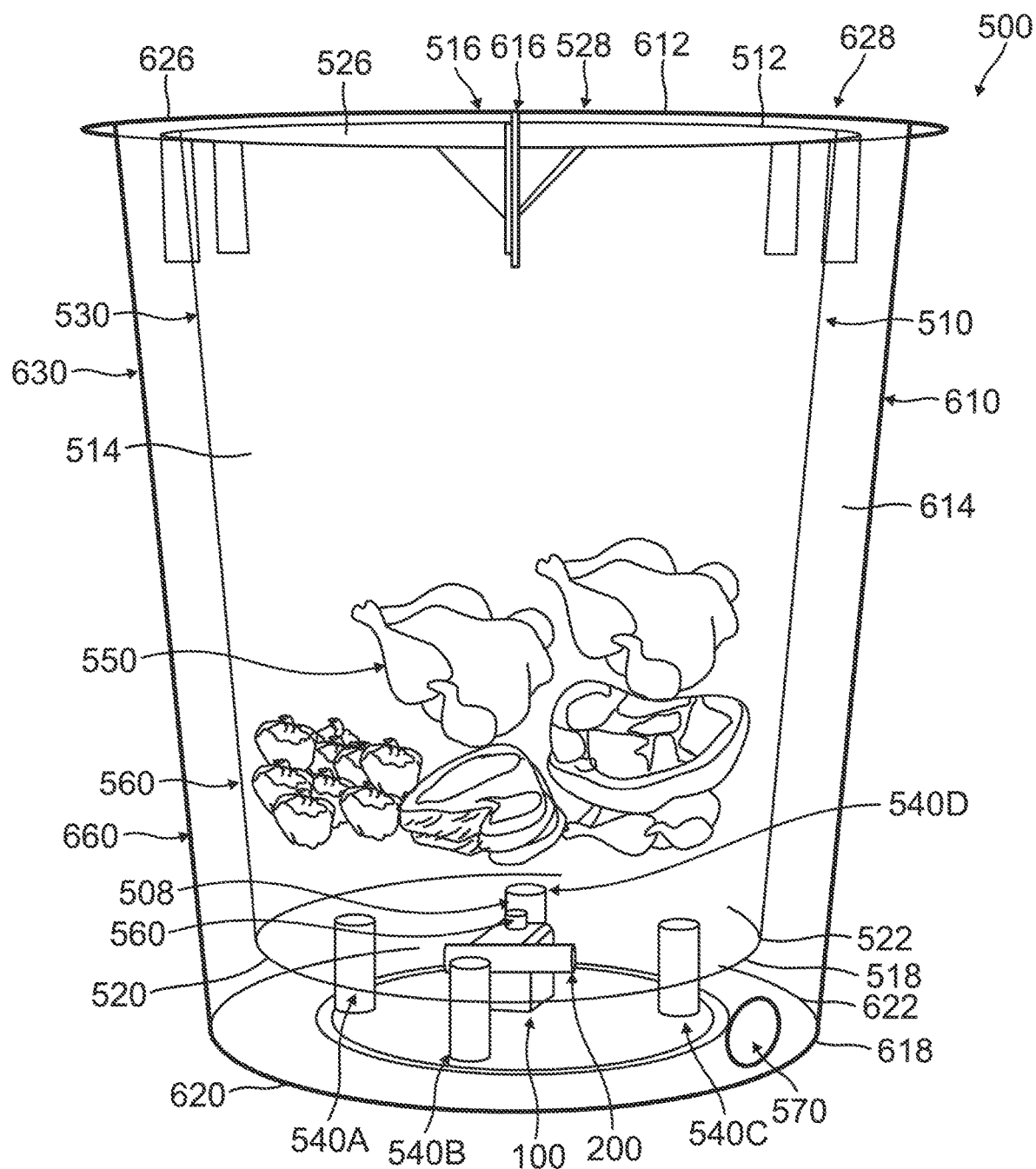
FIG. 6 is a right front elevational view of a second embodiment of the present invention illustrating a dual food thawing container having an interior container and an exterior container with a submersible water pump and heating element positioned between the interior container and the exterior container.
Figure 7:
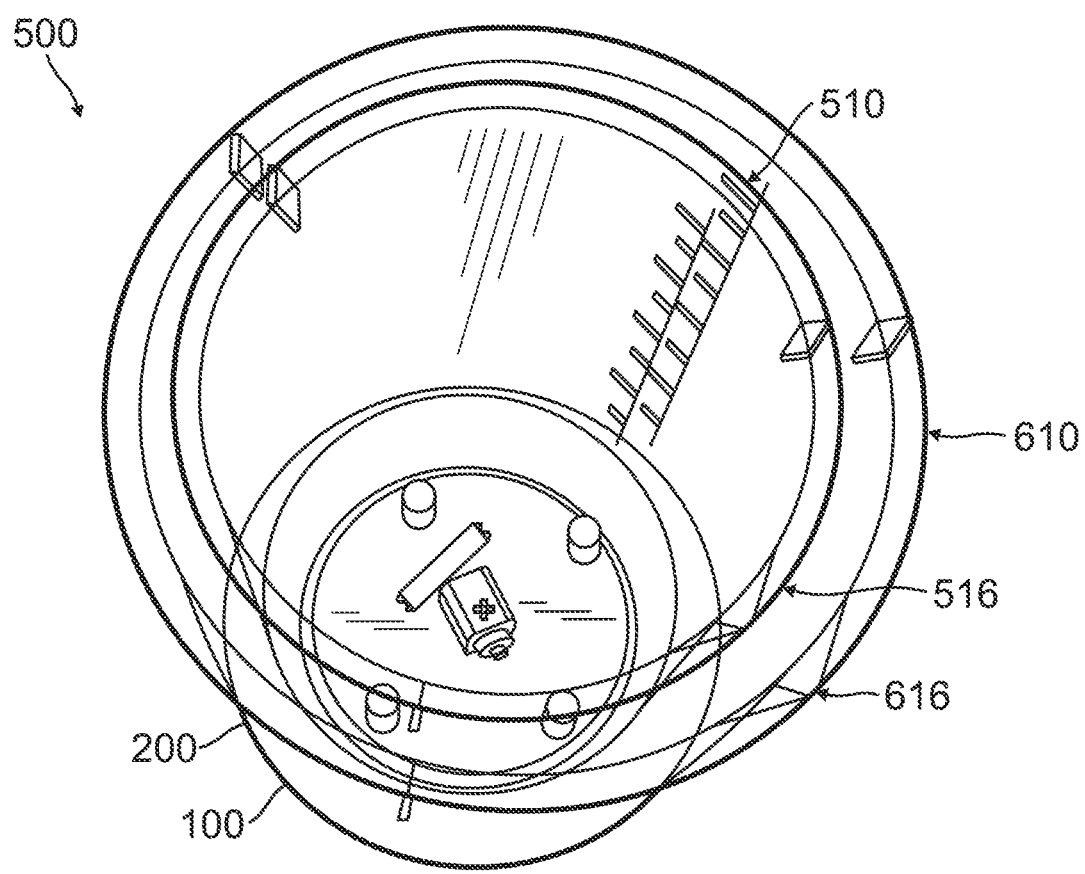
FIG. 7 is a top view of the second embodiment of the present invention illustrating a dual food thawing container having an interior container and an exterior container with a submersible water pump and heating element positioned between the interior container and the exterior container.

Referring to FIGS. 6 and 7, there is illustrated a second embodiment of the present invention dual food thawing container 500. The second embodiment dual food thawing container 500 consists of a dual interior container 510 and an exterior container 610. The use of a two-container system will allow the flow of water between containers and thaw food without the need for a sink to place the container into as was the case in the first embodiment.

Dual interior container 510 has an inner top circumferential edge 512, an inner top overflow spout 516, an inner bottom interior surface 518, an inner bottom exterior surface 520, an inner upper portion 530, an inner lower portion 560, an inner bottom circumferential edge 522, an inner interior circumferential wall 526, an inner exterior circumferential wall 514, and an inner interior chamber 528.

Further referring to FIG. 6, there is illustrated frozen food 550 within dual interior container 510 of dual food thawing container 500. Also illustrated in FIG. 6 are support posts 540A, 540B, 540c, and 540D which support dual interior container 510 above exterior container 610. Located in between dual interior container 510 and exterior container 610 are submersible pump 100 and heating element 200. There is also illustrated in FIG. 6, exterior container 610 having an outer top circumferential edge 612, an outer top overflow spout 616, an outer bottom interior surface 618, an outer bottom exterior surface 620, an outer upper portion 630, an outer lower portion 660, an outer bottom circumferential edge 622, an outer interior circumferential wall 626, an outer exterior circumferential wall 614, and an outer interior chamber 628.

Referring to FIGS. 6 and 7, frozen food 550 while floating within dual interior container 510 will thaw faster and more evenly as the flow of water enters via a discharge line 508 that extends from submersible pump 100. In use, similar to the first embodiment, water is heated in exterior container 610 and then pumped into dual interior container 510 by means of submersible pump 100. The flow of water that has been heated in exterior container 610 then flows vertically out of discharge line 508 into inner lower portion 560 of dual interior container 510.

Discharge line 508 allows the flow of the water to enter into dual interior container 510 at a vertical angle. Also, there is a pump hole 560 that discharge line 508 passes through to enter dual interior container 510. To prevent leakage and back flow, a sealant is used to prevent water from flowing back through this hole into exterior container 610. The sealant may be a ring sealant or epoxy type sealant that fills the gap between pump hole 560 and discharge line 508.

Referring to FIGS. 6 and 7, similar to the first embodiment, the present invention second embodiment is an improvement over the prior art by utilization of the second law of thermodynamics which states that heat tends to move from an area of higher temperature to an area of lower temperature. Therefore, within second embodiment food thawing container 500, water is pumped from outer inner portion 660 of exterior container 610 into inner lower portion 560 of dual interior container 510. The water will then flow vertically upwards by means of discharge line 508 having a vertically pointed direction of flow. The water will continue to flow upwardly within dual interior container 510 by means of heat tending to move from an area of higher temperature to an area of lower temperature. When the water rises to an elevation near inner top circumferential edge 512 of dual interior container 510, the water will flow from dual interior container 510 back into exterior container 610 by means of inner top overflow spout 516. This creates a circular flow of water using the same volume of water within present invention dual food thawing container 500. This volume of water will continue to thaw frozen food 550 by heated water flowing from inner lower portion 560 to the inner top circumferential edge 512. This process is continued until a desired time set by the user. This time can be controlled by existing government retail codes or by a time determined by a different set of criteria.

The present invention food thawing container having the flow of water upwardly through the system from a constant heat source also improves the thawing of food in the center regions of the food and not just the outside portions. This is a vast improvement over the prior art which provides thawing of food via water in a top down manner.

Referring to FIGS. 6 and 7, typically, the distance between inner bottom interior surface 518 of dual interior container 510 and outer bottom interior surface 618 of exterior container 610 is approximately 5 inches to 12 inches. These dimensions are not limiting but typical. Similarly, the distance between the exterior circumferential wall dual interior container 510 and inner circumferential wall of exterior container 610 is approximately 2 to 3 inches. These dimensions are not limiting but typical.

For proper operation and to avoid cavitation, the present invention dual food thawing container 500 should have dual interior container 510 filled with water completely and exterior container 610 should have water at least above the submersible pump. Similarly, the preferred design is to have the height of exterior container 610 taller than the height of dual interior container 510. For draining of the system after use, there is a drain hole 570 that can be plugged and unplugged. Drain hole 570 will be water tight during operation and can be opened to remove the water from dual food thawing container 500 after use and prior to storage.

Figure 8:
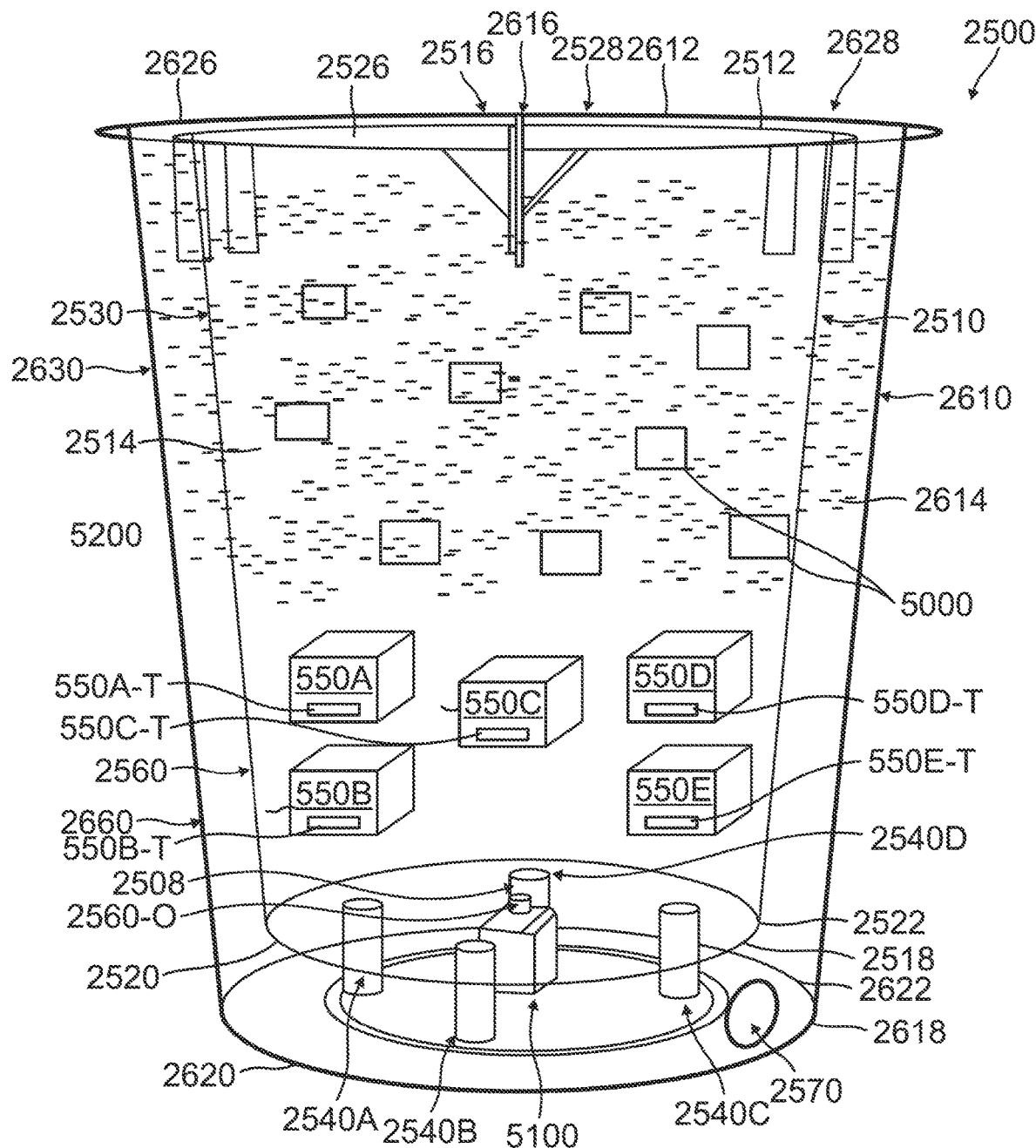
FIG. 8 is a right front elevational view of a third embodiment of the present invention illustrating a dual food chilling container having an interior container and an exterior container with a submersible water pump positioned between the interior container and the exterior container, the interior container filled with ice from one-quarter to eighty percent of the volume of the interior container and the remainder of the interior container filled with water until a sufficient quantity of water flows out of the interior container and rises to a water level within the exterior container to cover the submersible pump.

Referring to FIG. 8, there is illustrated a right front elevational view of a third embodiment of the present invention illustrating a dual food chilling container having an interior container and an exterior container with a submersible water pump positioned between the interior container and the exterior container, the interior container filled with ice from one-quarter to eighty percent of the volume of the interior container and the remainder of the interior container filled with water until a sufficient quantity of water flows out of the interior container and rises to a water level within the exterior container to cover the submersible pump.

Figure 9:
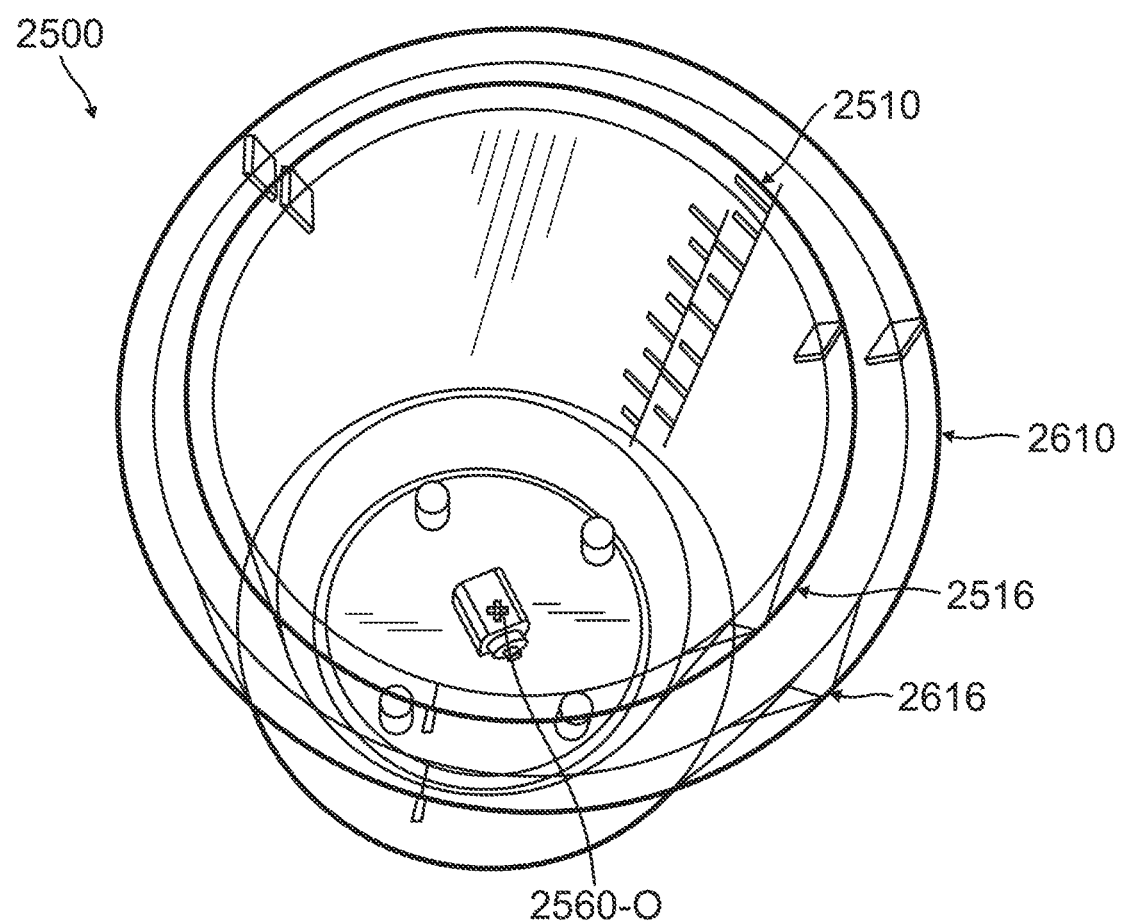
FIG. 9 is a top view of the third embodiment of the present invention illustrating a dual food chilling container having an interior container and an exterior container with a submersible water pump positioned between the interior container and the exterior container.

Referring to FIG. 9, there is illustrated a top view of the third embodiment of the present invention illustrating a dual food chilling container having an interior container and an exterior container with a submersible water pump positioned between the interior container and the exterior container.

Referring to FIGS. 8 and 9, there is illustrated a third embodiment of the present invention dual food chilling container 2500. The third embodiment dual food chilling container 2500 consists of a dual interior container 2510 and an exterior container 2610. The use of a two-container system will allow the flow of water between containers and reduce the temperature of hot food without the need for a sink to place the container into.

Dual interior container 2510 has an inner top circumferential edge 2512, an inner top overflow spout 2516, a bottom wall 2517, an inner bottom interior surface 2518, an inner bottom exterior surface 2520, an inner upper portion 2530, an inner lower portion 2560, an inner bottom circumferential edge 2522, a circumferential wall 2505, an inner interior circumferential surface 2526, an inner exterior circumferential surface 2514, and an inner interior chamber 2528.

Further referring to FIG. 8, there is illustrated a multiplicity of hot food containers 550A, 550B, 550C, 550D and 550E within dual interior container 2510 of dual food chilling container 2500. Each respective hot food container retains hot food, primarily a soup or a sauce, each hot food item having a starting temperature between one hundred sixty-five degrees Fahrenheit and one hundred forty degrees Fahrenheit. The purpose of the present invention is to reduce the temperature of each hot food to seventy degrees Fahrenheit in two hours or less from the time the hot food contents are placed into the dual interior container 2510.

Prior to inserting the hot food containers 550A, 550B, 550C, 550D and 550E into the interior container 2510, the interior container 2510 is filled with cubes of ice 5000 to between twenty percent and eighty percent of the volume of the interior container 2510. By way of example, the interior chamber has a volume of 0.5 cubic feet. The remainder of the interior container 2510 is filled with room temperature water 5200.

The interior container 2510 is supported within the exterior container 2610. By way of example, also illustrated in FIG. 8 are support posts 540A, 540B, 540C, and 540D which support interior container 2510 above exterior container 2610. Located in between interior container 2510 and exterior container 2610 is submersible pump 5100. There is also illustrated in FIG. 8, exterior container 2610 having an outer top circumferential edge 2612, an outer top overflow spout 2616, an outer bottom interior surface 2618, an outer bottom exterior surface 2620, an outer upper portion 2630, an outer lower portion 2660, an outer bottom circumferential edge 2622, an outer interior circumferential wall 2626, an outer exterior circumferential wall 2614, and an outer interior chamber 2628.

Referring to FIGS. 8 and 9, containers of hot food 550A, 550B, 550C, 550D and 550E are set into and float within ice cubes 5000 within interior container 2510 and will chill faster and more evenly to a temperature of seventy degrees Fahrenheit as the flow of water 5200 enters via a discharge line 2508 that extends from submersible pump 2100. In use, cold water chilled with ice enters exterior container 2610 from overflow spout 2516 to a water level above submersible pump 2100 and the water 5200 is then pumped into interior container 2510 by means of submersible pump 2100. The flow of water that has been chilled with ice in exterior container 2610 then flows vertically out of discharge line 2508 into inner lower portion 2560 of interior container 2510.

Discharge line 2508 allows the flow of the cold water to enter into interior container 2510 at a vertical angle. In addition, there is a pump hole 2560 that discharge line 2508 passes through to enter interior container 2510. To prevent leakage and back flow, a sealant is used to prevent water from flowing back through this hole into exterior container 2610. The sealant may be a ring sealant or epoxy-type sealant that fills the gap between pump hole 2560 and discharge line 2508.

Referring to FIGS. 8 and 9, the heat within hot food containers 550A, 550B, 550C, 550D and 550E is reduced as cold water 5200 is pumped from outer inner portion 2660 of exterior container 2610 into inner lower portion 2560 of interior container 2510. The water 5200 will then flow vertically upwards by means of discharge line 2508 having a vertically pointed direction of flow. The ice cold water 5200 will continue to flow upwardly within interior container 2510 by means of heat tending to move from an area of higher temperature to an area of lower temperature. When the water rises to an elevation near inner top circumferential edge 2512 of interior container 2510, the water flows from interior container 2510 back into exterior container 2610 by means of inner top overflow spout 2516. This creates a circular flow of water using the same volume of water within present invention dual food chilling container 2500. This volume of water will continue to reduce the temperature of hot food in hot food containers 550A, 550B, 550C, 550D and 550E by ice cold water 5200 flowing from inner lower portion 2560 to the inner top circumferential edge 2512. Each hot food container has a temperature strip on a container sidewall to view the temperature within each hot food container. Hot food container 550A has a temperature strip 550A-T. Hot food container 550B has a temperature strip 550B-T. Hot food container 550C has a temperature strip 550C-T. Hot food container 550D has a temperature strip 550D-T. Hot food container 550E has a temperature strip 550E-T. A timer 6000 is at a location adjacent exterior container 2610. Therefore, an observer can measure how much time has elapsed and the decrease in temperature in each hot food container. The hot food must have its temperature reduced to seventy degrees Fahrenheit within two hours of the start time.

This process is continued until a desired time set by the user. This time can be controlled by existing government codes or by a time determined by a different set of criteria.

The present invention food chilling container having the flow of water upwardly through the system from a constant ice cold water source also improves the required reduction of temperature in the center regions of the hot food containers and not just the outside portions of each hot food container.

Referring to FIGS. 8 and 9, typically, the distance between inner bottom interior surface 2518 of interior container 2510 and outer bottom interior surface 2618 of exterior container 2610 is approximately five inches to twelve inches. These dimensions are not limiting but typical. Similarly, the distance between the exterior circumferential wall interior container 2510 and inner circumferential wall of exterior container 2610 is approximately 2 to 3 inches. These dimensions are not limiting but typical.

For proper operation and to avoid cavitation, the present invention dual food chilling container 2500 should have interior container 2510 completely filled with ice 5000 and water 5200 and exterior container 2610 should have water at least above the submersible pump 2100. Similarly, the preferred design is to have the height of exterior container 2610 taller than the height of interior container 2510. For draining of the system after use, there is a drain hole 2570 that can be plugged and unplugged. Drain hole 2570 will be watertight during operation and can be opened to remove the water from dual food chilling container 2500 after use and prior to storage.

Figure 10:
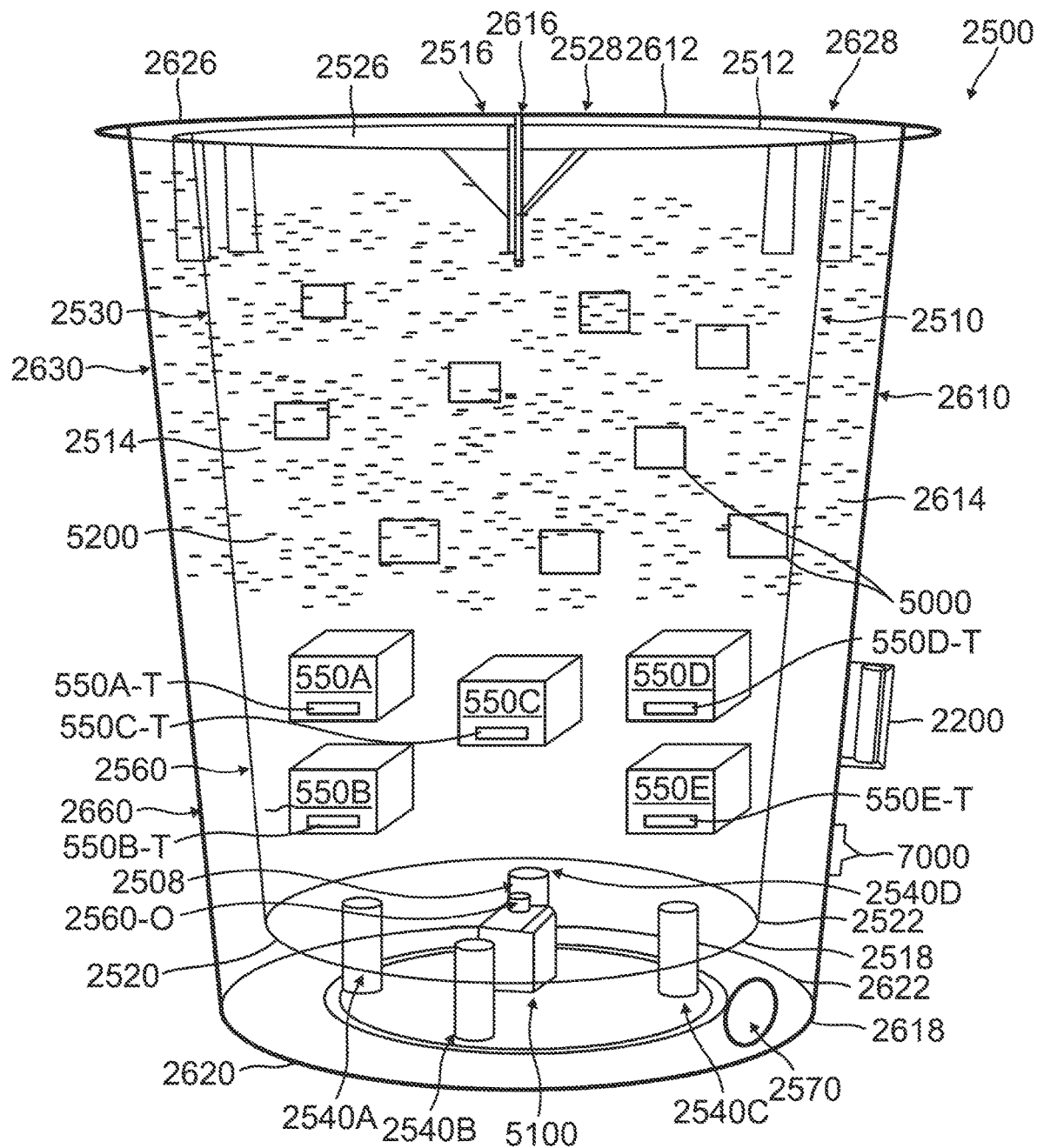
FIG. 10 is a right front elevational view of a fourth embodiment of the present invention illustrating a dual food chilling and/or thawing container having an interior container and an exterior container with a submersible water pump and heater positioned between the interior container and the exterior container with a switch to cause only the submersible pump to be activated for food chilling or the switch causing both the submersible pump and heater to be activated for food thawing, for food chilling, the interior container is filled with ice from one-quarter to eighty percent of the volume of the interior container and the remainder of the interior container filled with water until a sufficient quantity of water flows out of the interior container and rises to a water level within the exterior container to cover the submersible pump and for food thawing, the interior container is filled with water and the recirculated water is heated to thaw the food, as previously described.

Referring to FIG. 10, there is illustrated a right front elevational view of a fourth embodiment of the present invention illustrating a dual food chilling and/or thawing container having an interior container and an exterior container with a submersible water pump 2100 and heater 2200 positioned between the interior container 2510 and the exterior container 2610 with a switch 7000 to cause only the submersible pump 2100 to be activated for food chilling or the switch is moved causing both the submersible pump 2100 and heater 2200 to be activated for food thawing. If only the submersible pump 2100 is activated, the interior container is filled with ice from one-quarter to eighty percent of the volume of the interior container and the remainder of the interior container filled with water until a sufficient quantity of water flows out of the interior container and rises to a water level within the exterior container to cover the submersible pump. The operation has been described with reference to FIGS. 8 and 9. If both the submersible pump 2100 and heat 200 are activated for food thawing, this operation has been described with reference to FIGS. 6 and 7.

Figure 11:
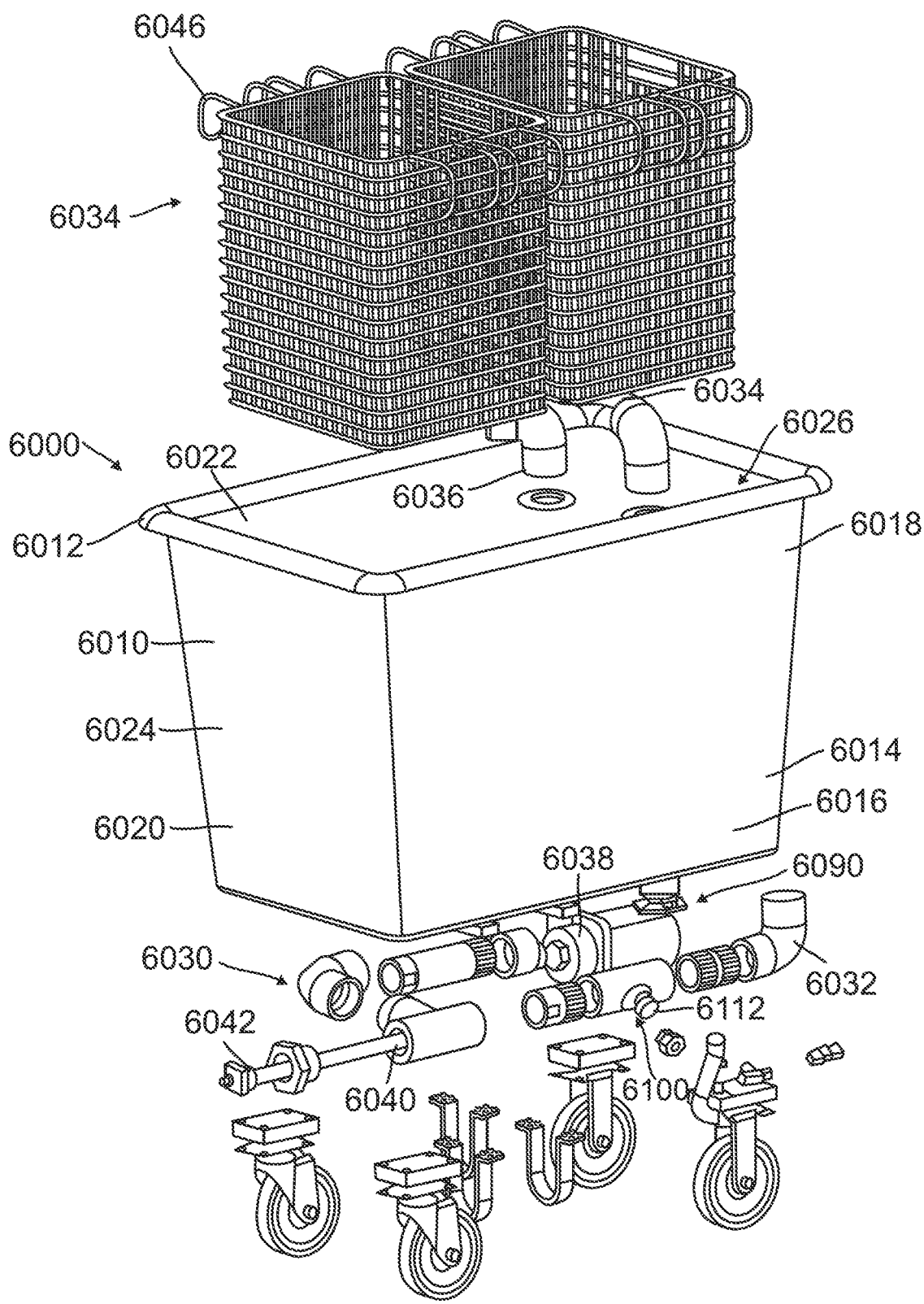
FIG. 11 is an exploded view of a fifth embodiment of the present invention illustrating a dual food chilling and/or thawing container having a plumbing system with a pump affixed under the container.
Figure 12:
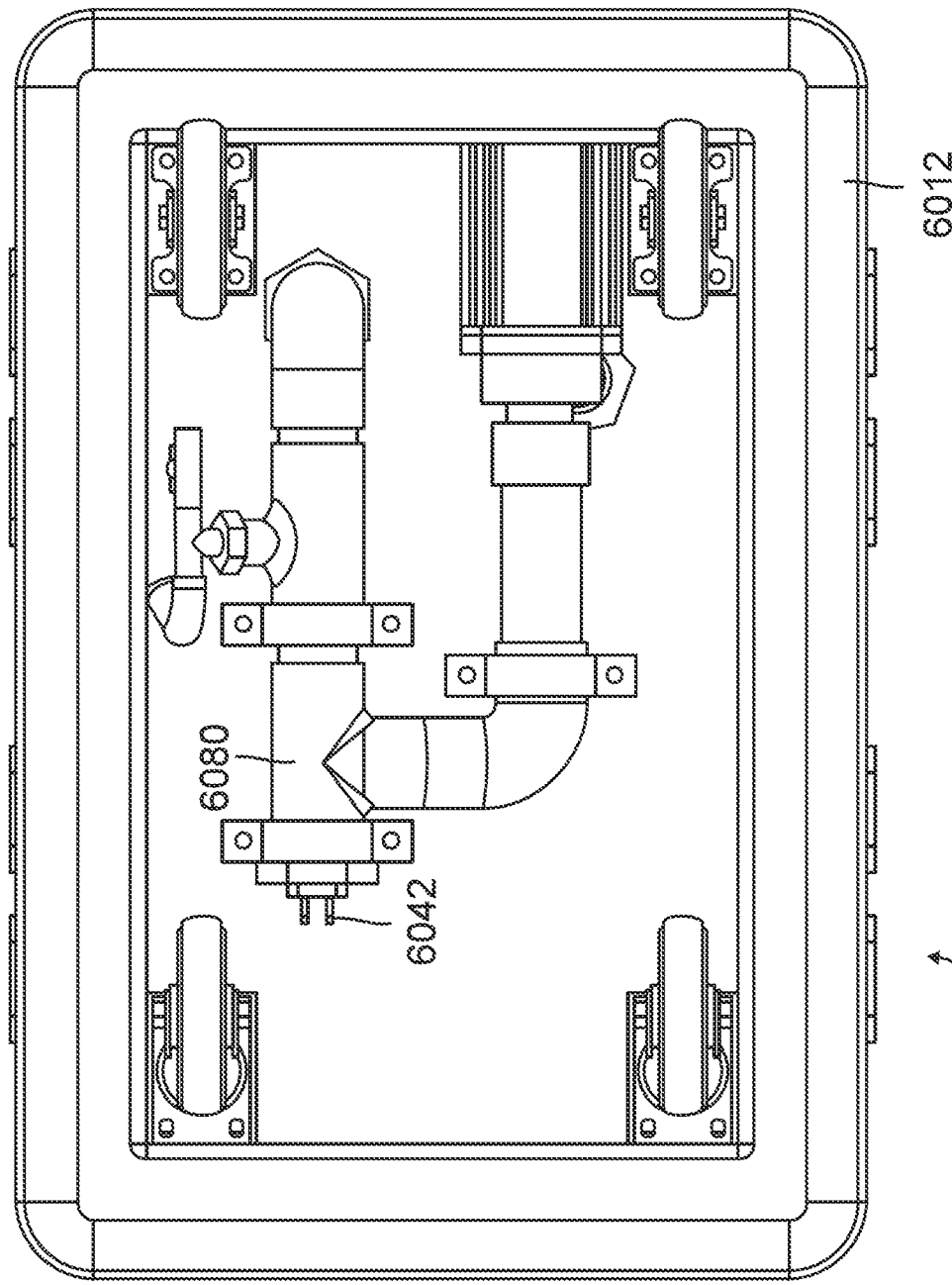
FIG. 12 is a bottom view of a fifth embodiment of the present invention illustrating a dual food chilling and/or thawing container having a plumbing system with a pump affixed under the container.
Figure 13:
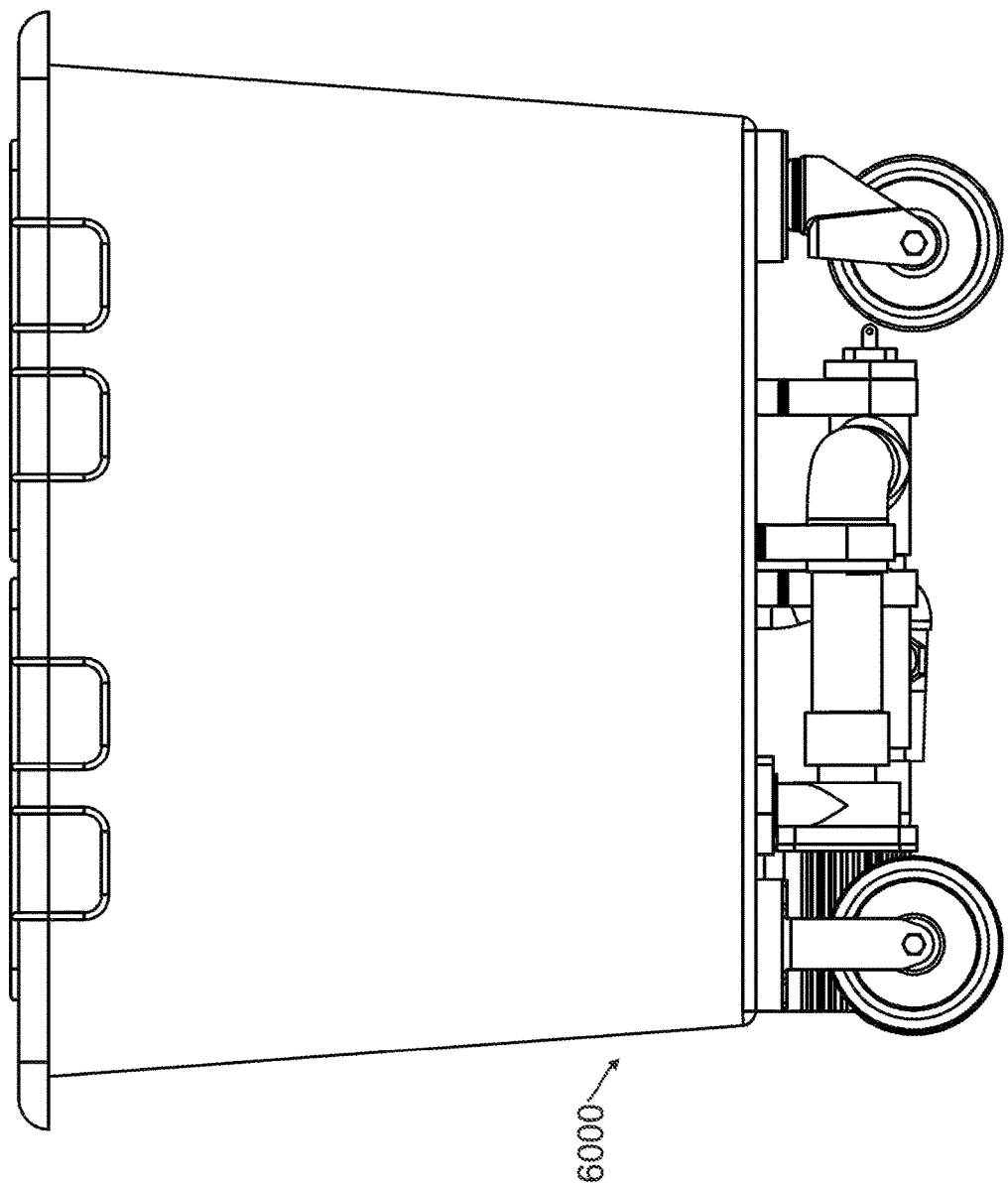
FIG. 13 is a side view of a fifth embodiment of the present invention illustrating a dual food chilling and/or thawing container having a plumbing system with a pump affixed under the container.
Figure 14:
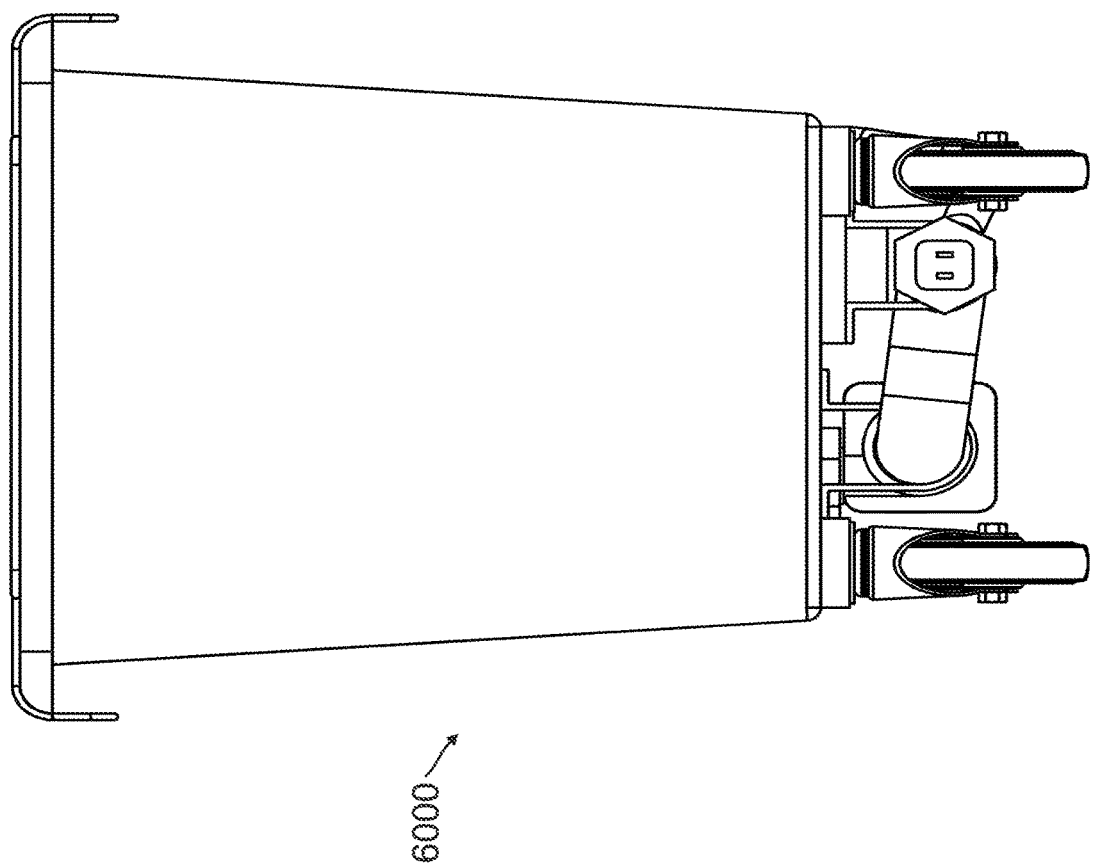
FIG. 14 is a rear view of a fifth embodiment of the present invention illustrating a dual food chilling and/or thawing container having a plumbing system with a pump affixed under the container.

Referring to FIGS. 11 and 12, there is a fifth embodiment of the present invention illustrating a container assembly 6000 adapted to defrost and cool food, the container assembly comprising a container 6010 including a top edge 6012, a bottom interior surface 6014, a bottom exterior surface 6016, an upper portion 6018, a lower portion 6020, an inner interior circumferential wall 6022, an exterior circumferential wall 6024, and an inner interior chamber 6026. The lower portion containing a plumbing system 6030 with said plumbing system further containing, at least one pipe 6032, an inlet 6034, an outlet 6036, a pump 6038 directly connected to a heater 6040. The heater 6040 within this system is to a power source 6042.

Referring to FIGS. 11 and 12 the present invention container assembly 6000 further contains an inlet 6034 located along said plumbing system 6030 at a location closer to said inner interior circumferential wall 6022 than outlet 6036. It is also within the spirit and scope of this invention to include at least one basket 6044 for food to be placed into. These baskets are sized to fit within inner interior chamber 6026 and have handles 6046 for easy removal and for removably resting on top edge 6012.

Further referring to Referring to FIGS. 11 and 12 the present invention container assembly 6000 contains a plumbing system 6030 having a filtration screen 6072 that can be made from mesh, stainless steel, and any material known within the industry in the creation of filtration screens for similar purposes. It should be understood that filtration screen (not illustrated) may be in multiple locations throughout plumbing system 6030, however the preferred location is between inlet 6034 and basket 6044.

Further included in plumbing system 6030 is an ultraviolet light 6090. It is also within the spirit and scope of this invention to include Ultraviolet (UV) lights emitting any wavelengths, but UV less than 300 nanometers are known to kill bacteria. Additionally, the present invention container assembly 6000 contains a plumbing system 6030 having a drain 6100 directly connected to a valve 6112. Valve 6112 is designed to allow flow exit and enter plumbing system 6030 to allow for easy draining and filling when needed.

Further included within container assembly 6000 is a control switch (not illustrated) adjacent at the bottom of container assembly 6000 and adjacent power source 6042. When the control switch is set to defrost, the heater is activated to heat the water and when the control switch is set to cool the heater is not activated and water will flow through the system without being heated. It is also understood that the lower portion may having a cover below the container to encase plumbing system 6030. In operation container assembly 6000 is filled with water for circulation within at least one pipe 6032 in a generally horizontal plane. Water is then pumped from inlet 6034 to outlet 6036 via pump 6038 and all through plumbing system 6030 and heated if needed to defrost food within container assembly 6000. Additionally, there is a "T" connection 6080 located between said heater and said power source.

For background regarding Ultraviolet germicidal irradiation (UVGI), UVGI is a disinfection method that uses short-wavelength ultraviolet (ultraviolet C or UV-C) light to kill or inactivate microorganisms by destroying nucleic acids and disrupting their DNA, leaving them unable to perform vital cellular functions. UVGI is used in a variety of applications, such as food, air, and water purification. UV light is electromagnetic radiation with wavelengths shorter than visible light but longer than X-rays. UV is categorized into several wavelength ranges, with short-wavelength UV (UV-C) considered "germicidal UV". Wavelengths between about 200 nanometers and 300 nanometers are strongly absorbed by nucleic acids. The absorbed energy can result in defects including pyrimidine dimers. These dimers can prevent replication or can prevent the expression of necessary proteins, resulting in the death or inactivation of the organism. Typically, 200 nm to 280 nm (UVC) are useful for disinfection and sensing; 280 nm to 315 nm (UVB) are useful for curing, and medical applications and 315 nm to 400 nm UVA (or "near UV") are useful for printing, curing, lithography, sensing and medical applications.

For background regarding Eddy currents (also called Foucault's currents), Eddy currents are loops of electrical current induced within conductors by a changing magnetic field in the conductor according to Faraday's law of induction. Eddy currents flow in closed loops within conductors, in planes perpendicular to the magnetic field. They can be induced within nearby stationary conductors by a time-varying magnetic field created by an AC electromagnet or transformer, for example, or by relative motion between a magnet and a nearby conductor. The magnitude of the current in a given loop is proportional to the strength of the magnetic field, the area of the loop, and the rate of change of flux, and inversely proportional to the resistivity of the material. When graphed, these circular currents within a piece of metal look vaguely like eddies or whirlpools in a liquid.

In general, the equations described are submitted within a two-dimensional context to facilitate understanding of the dimensional ranges within which most desirable water flow conditions can be achieved in a tub with a rectangular bottom and trapezoidal sides. Three-dimensional context requires sharing proprietary software that accounts for a steradian geometry and view factor considerations.

Figure 15:
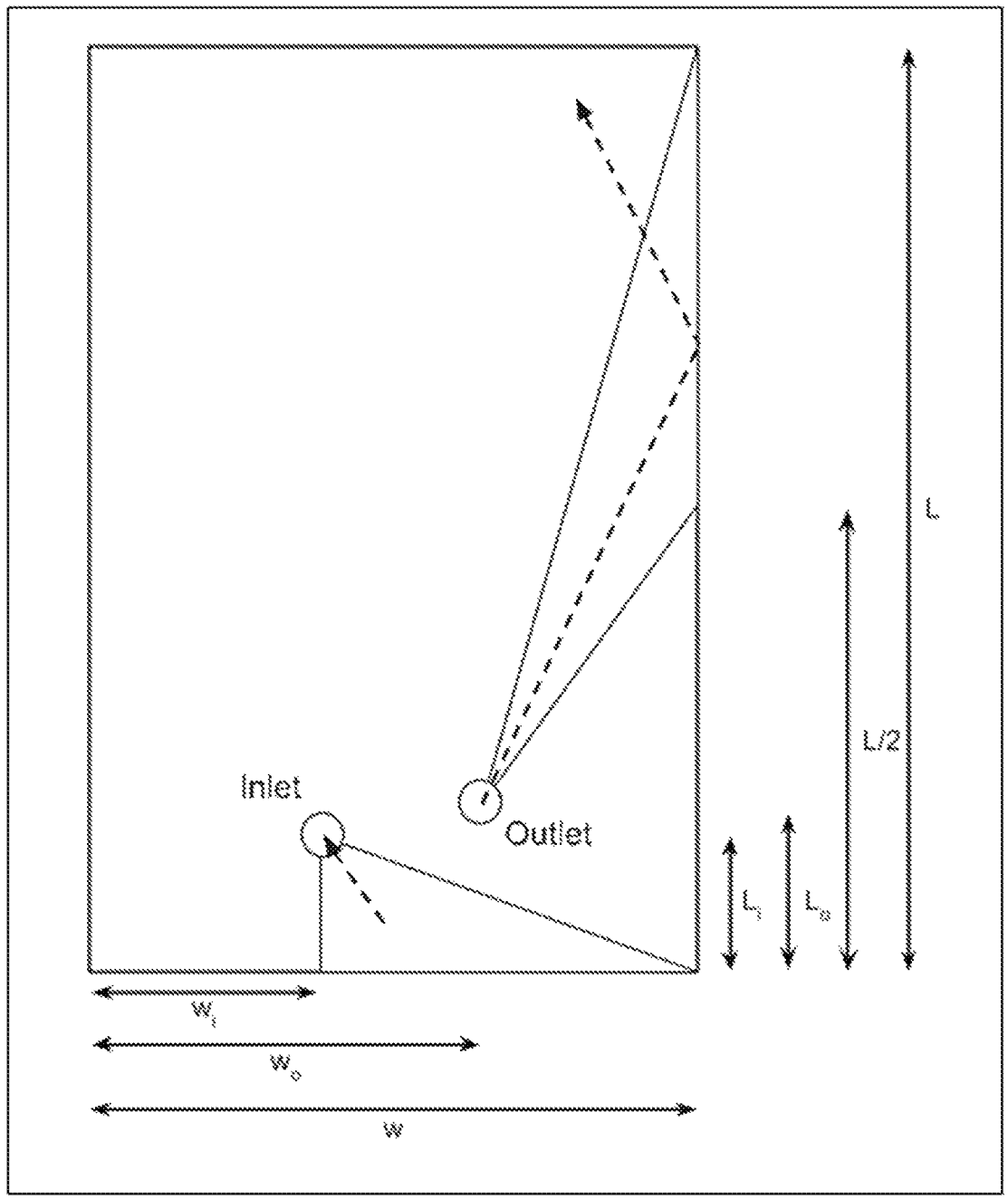
FIG. 15 is a schematic showing the plan view of a fifth embodiment of the present invention illustrating inlet and outlet locations relative to each other and to the container walls.
Figure 16:
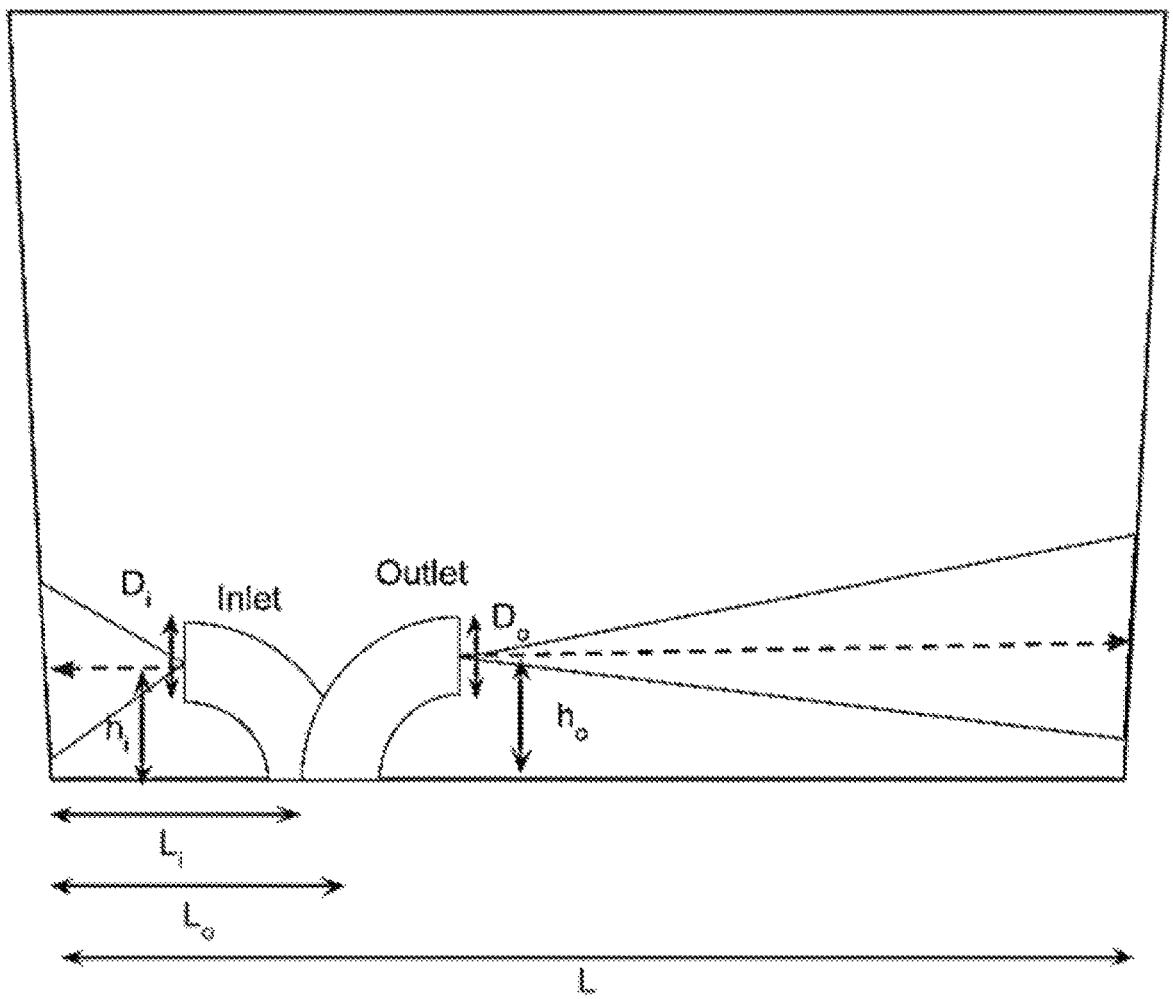
FIG. 16 is a schematic showing the elevation view of a fifth embodiment of the present invention illustrating inlet and outlet locations relative to each other and to the container walls.

Referring to FIGS. 15 and 16, in the plane parallel to the bottom of container 6010 (also referred herein as "tub") the range of angles is illustrated. The dotted lines show the direction of optimum water flow. The triangular shaped areas show the acceptable range in which the inlet and outlet openings are to be directed. The acceptable range of angles of the outlet are given by the following equations:

$$\theta^-_{outlet} = \arctan\left(\frac{L/2 - L_o}{W - W_o}\right)$$

$$\theta^+_{outlet} = \arctan\left(\frac{L - L_o}{W - W_0}\right)$$

$$\theta_{outlet} = \theta^+_{outlet} - \theta^-_{outlet}$$

The acceptable range of angles for the inlet is given by:

$$\theta_{inlet} = 90° - \arctan\left(\frac{L_i}{W - W_i}\right)$$

In the plane perpendicular to the bottom of the tub, the range of angles is illustrated in FIG. 16. The dotted lines show the direction of optimum water flow. This optimum flow is parallel to the bottom of the tub (horizontal). The triangular shaped areas show the acceptable range in which the inlet and outlet are to point. For a given volume of water and food in the tub the triangular shaped area depends on the diameters of the inlet and outlet pipes; the position on the bottom of the tub of the inlet and outlet; and the center height of the inlet and outlet. The range of angles are given by the following equations:

$$\phi_{inlet} = 2 \cdot \arctan\left(\frac{\left|h_i - \frac{D_i}{2}\right|}{L_i}\right)$$

$$\phi_{outlet} = 2 \cdot \arctan\left(\frac{\left|h_o - \frac{D_o}{2}\right|}{L - L_o}\right)$$

The acceptable ranges of angles in these two planes are representative of the angles that will induce the most vorticity in the flow as to maximize the agitation of the liquid on the surface of the food being defrosted. Research conducted by the innovator of this device—using novel techniques grounded in thermodynamics and fluid dynamics principles and facilitated by computational modeling facilitated by high powered computers has proven that increased vorticity (thus increased flow velocity around the subject) in this application increases convective heat transfer rates. These calculations will hold true for any size tub. However, industry practice favors an optimal container length (L) to width (w) ratio of about 5:3.

Referring to FIGS. 15 and 16, to address some of the other variables, the location of the outlet is more forward than the inlet to minimize the potential of the formation of a minimal agitation spot in a corner. The inlet and outlet are separated by no more than two (2) diameters, to maximize flow agitation and minimize formation of minimal agitation spots. The inlet and outlet are positioned no more than four (4) diameters away from three (3) edges of the tub as shown in FIG. 15. This maximizes flow agitation and minimizes the formation of minimal agitation spots. The inlet and outlet are positioned no more than two (2) diameters away from the edges of the tub. This minimizes flow dissipation due to wall surface interference effects. The center height of the inlet and outlet, measured from the bottom of the tub, shall be at $\frac{1}{10}$th of the total depth of the tub. This leaves enough water to be agitated by the outlet/inlet while still leaving usable room in the tub. This also doesn't leave too much water, such that the energy of the flow dissipates before making its way around the thawing subject. The diameter of the inlet and outlet are chosen such that the usable cross-sectional area in the plumbing section (i.e., area of the pipe minus the area of the instruments) matches that of the pump. For a typical system this would be equal to 1.5 inches in diameter, but it should be understood that this application is not limited to only this size.

Referring to FIG. 16, the container walls are preferably angled between four degrees (4°) and six degrees (6°) as to impart a vertical component of the flow as it reflects off the container walls. This allows the water on the top of the container to be agitated to a similar degree as the water at the bottom of the container. It is also within the spirit and scope of this invention for the container walls to for other shapes in addition to a rectangular shape. These shapes include polygons and elliptical shapes.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A container assembly adapted to thaw and cool food, the container assembly comprising:
   a. a container including a top edge, a bottom interior surface, a bottom exterior surface, an upper portion, a lower portion, an inner interior circumferential wall, an exterior circumferential wall, and an inner interior chamber;
   b. said lower portion containing a plumbing system with said plumbing system further containing, at least one pipe, an inlet, an outlet, a pump directly connected to a heater and said heater directly connected to a power source;
   c. said inlet located along said plumbing system at a location closer to said inner interior circumferential wall than said outlet;
   d. at least one basket sized to fit within said inner interior chamber;
   e. said plumbing system further comprising:
      i. a filtration screen located between said inlet and said at least one basket;
      ii. an ultraviolet light; and
      iii. a "T" connection located between said heater and said power source;
   f. a hole in said bottom interior surface with said hole directly connected to a valve;
   g. a control switch to choose between thaw and cool;
   h. said lower portion having a cover below the container;
   i. the inlet and outlet being separated by no more than two times the diameter of said at least one pipe;
   j. wherein said improved container is filled with water for circulation within said at least one pipe in a generally horizontal plane; and
   k. whereby water is pumped from said inlet to said outlet and heated by said heater for thawing of food within said improved container assembly.

2. The improved container assembly in accordance with claim 1, wherein: the ultraviolet light emitted within said plumbing system has a wavelength between 200 nanometers and 400 nanometers.

3. The improved container assembly in accordance with claim 1, wherein: the at least one basket removably attaches to said top edge.

4. The improved container assembly in accordance with claim 1, wherein: said inner interior circumferential wall has vertical walls with angles between 96 degrees and 84 degrees.

5. A container assembly adapted to thaw and cool food, the container assembly comprising:
   a. a container including a top edge, a bottom interior surface, a bottom exterior surface, an upper portion, a lower portion, an inner interior circumferential wall, an exterior circumferential wall, and an inner interior chamber;
   b. said lower portion containing a plumbing system with said plumbing system further containing, at least one pipe, an inlet, an outlet, a pump directly connected to a heater and said heater directly connected to a power source;
   c. said inlet located along said plumbing system at a location closer to said inner interior circumferential wall than said outlet;
   d. at least one basket sized to fit within said inner interior chamber;
   e. a hole in said bottom interior surface with said hole directly connected to a valve;
   f. the inlet and outlet being separated by no more than two times the diameter of said at least one pipe;
   g. wherein said improved container is filled with water for circulation within said at least one pipe in a generally horizontal plane; and
   h. whereby water is pumped from said inlet to said outlet and heated by said heater for thawing of food within said improved container assembly.

6. The improved container assembly in accordance with claim 5, wherein: the at least one basket removably attaches to said top edge.

7. The improved container assembly in accordance with claim 5, wherein: said inner interior circumferential wall has vertical walls with angles between 96 degrees and 84 degrees.

8. The improved container assembly in accordance with claim 5, wherein: said plumbing system further comprises: a filtration screen located between said inlet and said at least one basket.

9. The improved container assembly in accordance with claim 5, wherein: said plumbing system contains an ultraviolet light.

10. The improved container assembly in accordance with claim 5, wherein: said plumbing system contains a "T" connection located between said heater and said power source.

11. The improved container assembly in accordance with claim 5, wherein: the container assembly comprises a control switch to choose between thaw and cool.

\* \* \* \* \*